June 2, 1942.   J. R. PEIRCE   2,285,353
CALCULATING MACHINE
Original Filed May 9, 1933   9 Sheets-Sheet 1
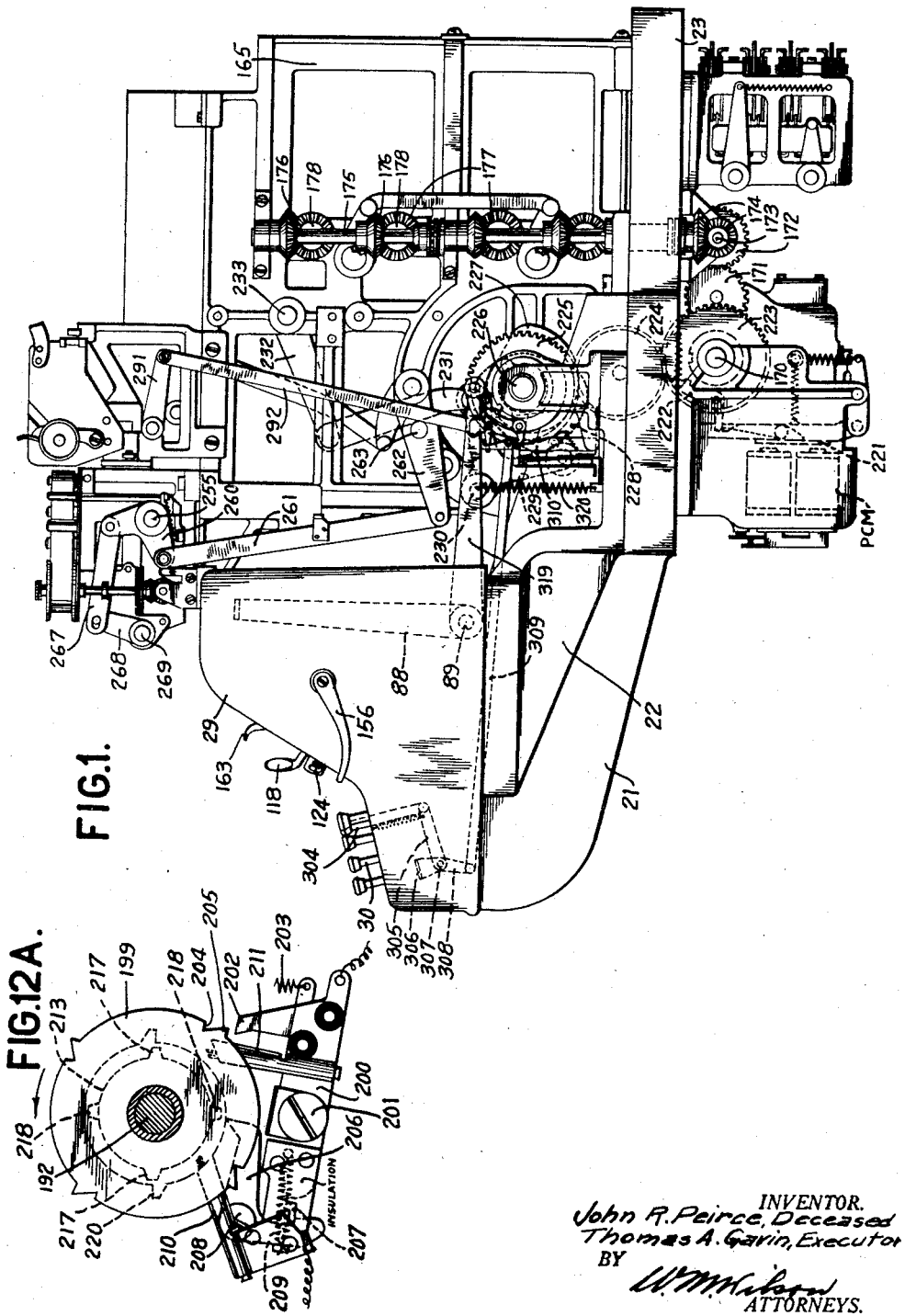
INVENTOR.
John R. Peirce, Deceased
Thomas A. Gavin, Executor
BY
ATTORNEYS.

June 2, 1942.   J. R. PEIRCE   2,285,353
CALCULATING MACHINE
Original Filed May 9, 1933   9 Sheets-Sheet 2
FIG.6.
| LEDGER No. |
|---|
| 1310 |
| 1470 |
| 1470 |
| 1470 |
| 1524 |
| 1524 |
| 1524 |
| 1524 |
| 1600 |
| LEDGER 1524 | | | |
|---|---|---|---|
| DATE | MERCHANDISE | AMT. | BAL. |
| 12-3-16 | RUG | 150.00 | |
| 12-5-16 | TABLE | 200.00 | 350.00 |
| 1-6-17 | PIANO | 600.00 | |
| 1-6-17 | RADIO | 100.00 | 1050.00 |
| 5-5-17 | LAMP | 50.00 | |
| 5-5-17 | SOFA | 300.00 | |
| 5-10-17 | RUG | 200.00 | |
| 5-12-17 | SUITE | 700.00 | 2300.00 |
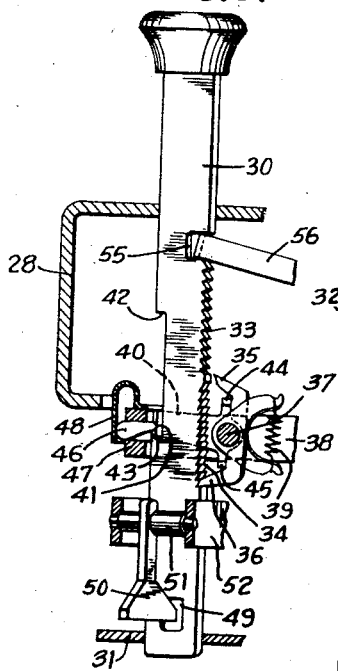
FIG.5.
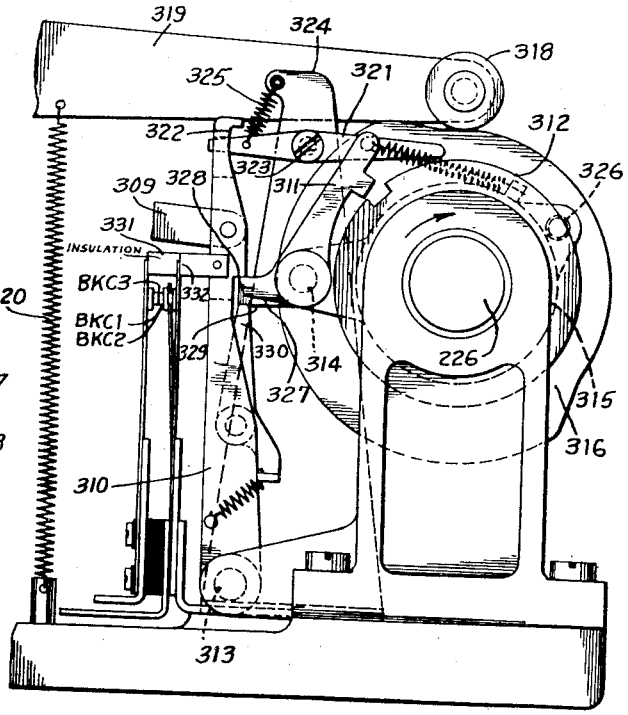
FIG.2.
INVENTOR.
John R. Peirce, Deceased
Thomas A. Gavin, Executor
BY
ATTORNEYS.

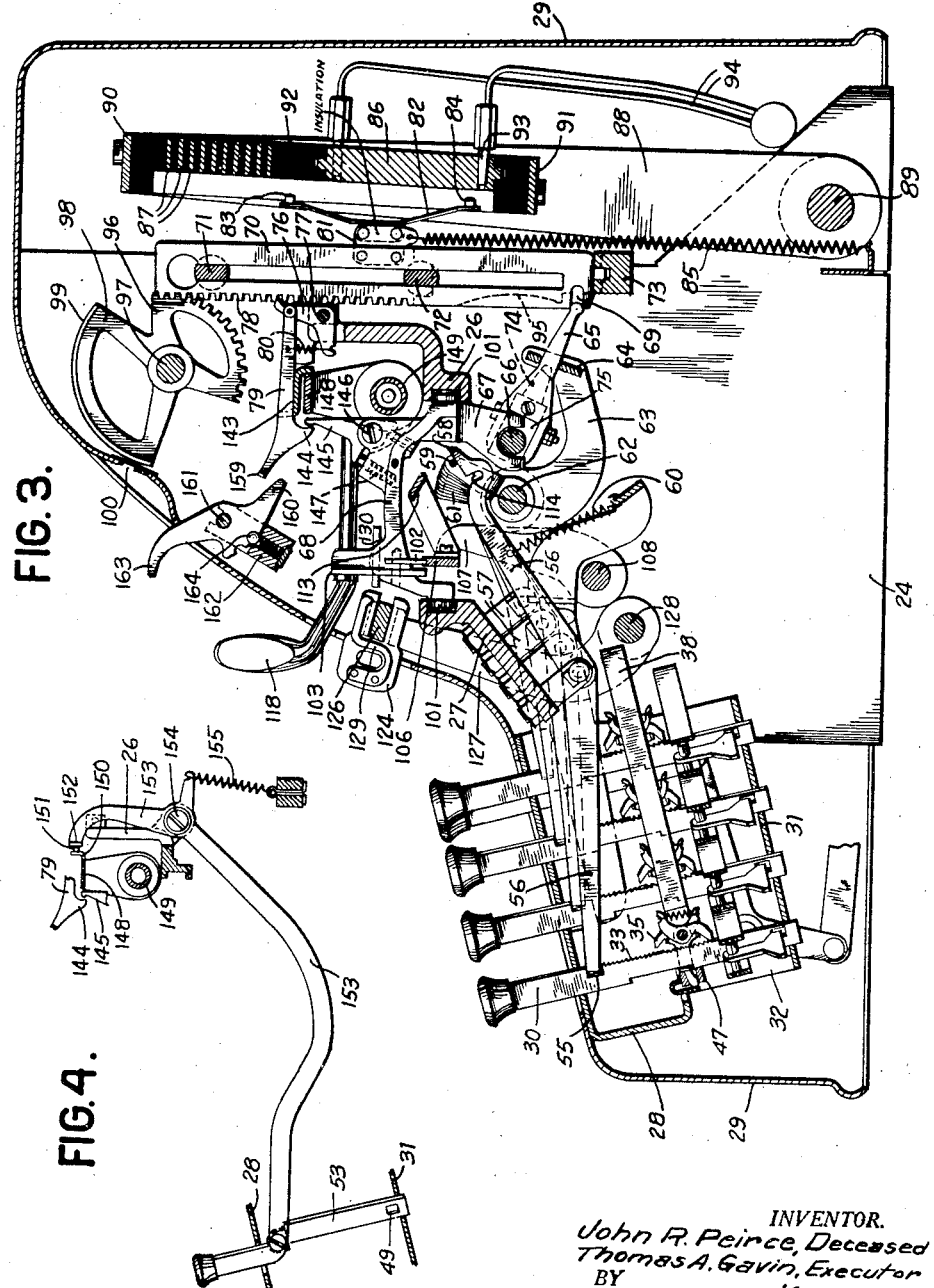

June 2, 1942.  J. R. PEIRCE  2,285,353
CALCULATING MACHINE
Original Filed May 9, 1933  9 Sheets-Sheet 4

INVENTOR.
John R. Peirce, Deceased!
Thomas A. Gavin, Executor
BY
ATTORNEYS.

June 2, 1942.  J. R. PEIRCE  2,285,353
CALCULATING MACHINE
Original Filed May 9, 1933  9 Sheets-Sheet 5
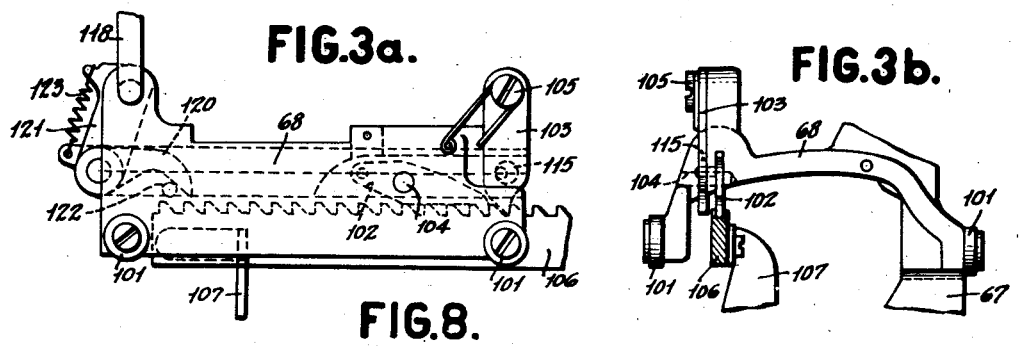
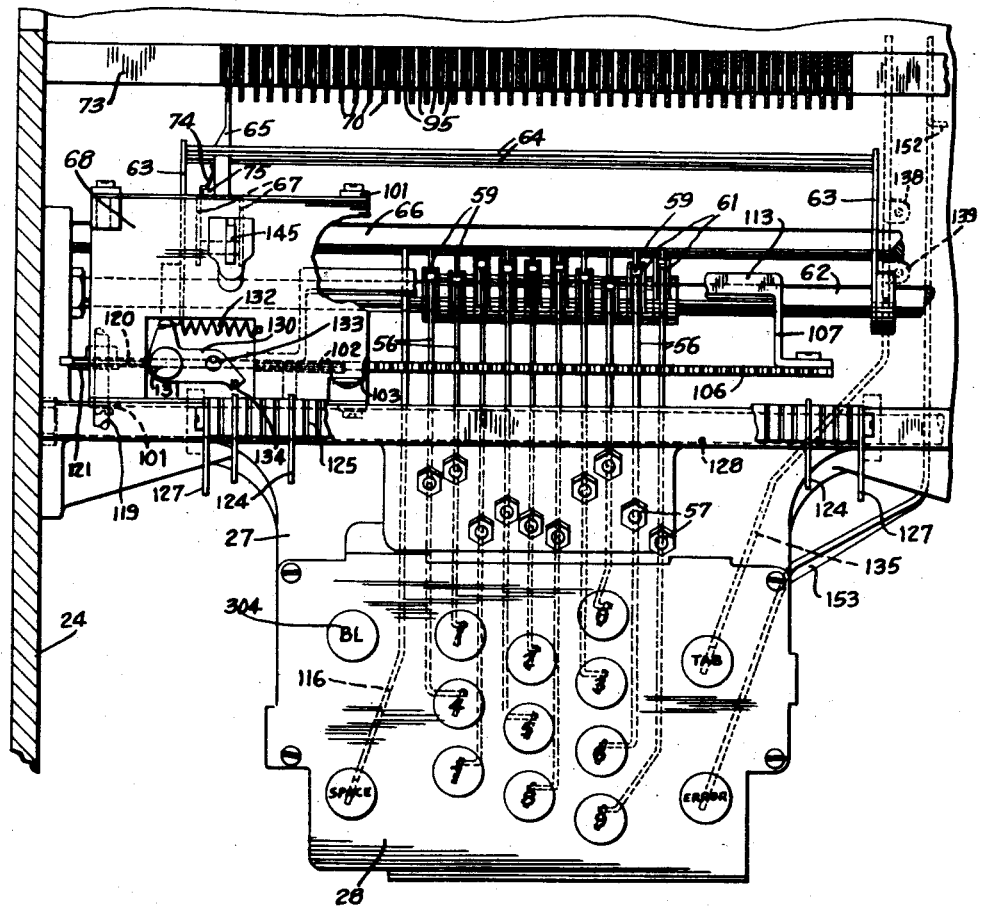
John R. Peirce, Deceased INVENTOR.
Thomas A. Gavin, Executor
BY
ATTORNEYS.

June 2, 1942.　　　J. R. PEIRCE　　　2,285,353
CALCULATING MACHINE
Original Filed May 9, 1933　　　9 Sheets-Sheet 6

INVENTOR.
John R. Peirce,
Deceased,
Thomas A. Gavin,
Executor.
BY
ATTORNEYS.

June 2, 1942. J. R. PEIRCE 2,285,353
CALCULATING MACHINE
Original Filed May 9, 1933 9 Sheets-Sheet 7

INVENTOR.
John R. Peirce, Deceased
Thomas A. Gavin, Executor
BY
ATTORNEYS.

June 2, 1942.  J. R. PEIRCE  2,285,353

CALCULATING MACHINE

Original Filed May 9, 1933    9 Sheets—Sheet 8

INVENTOR.
John R. Peirce, Deceased
Thomas A. Gavin, Executor
BY
ATTORNEYS.

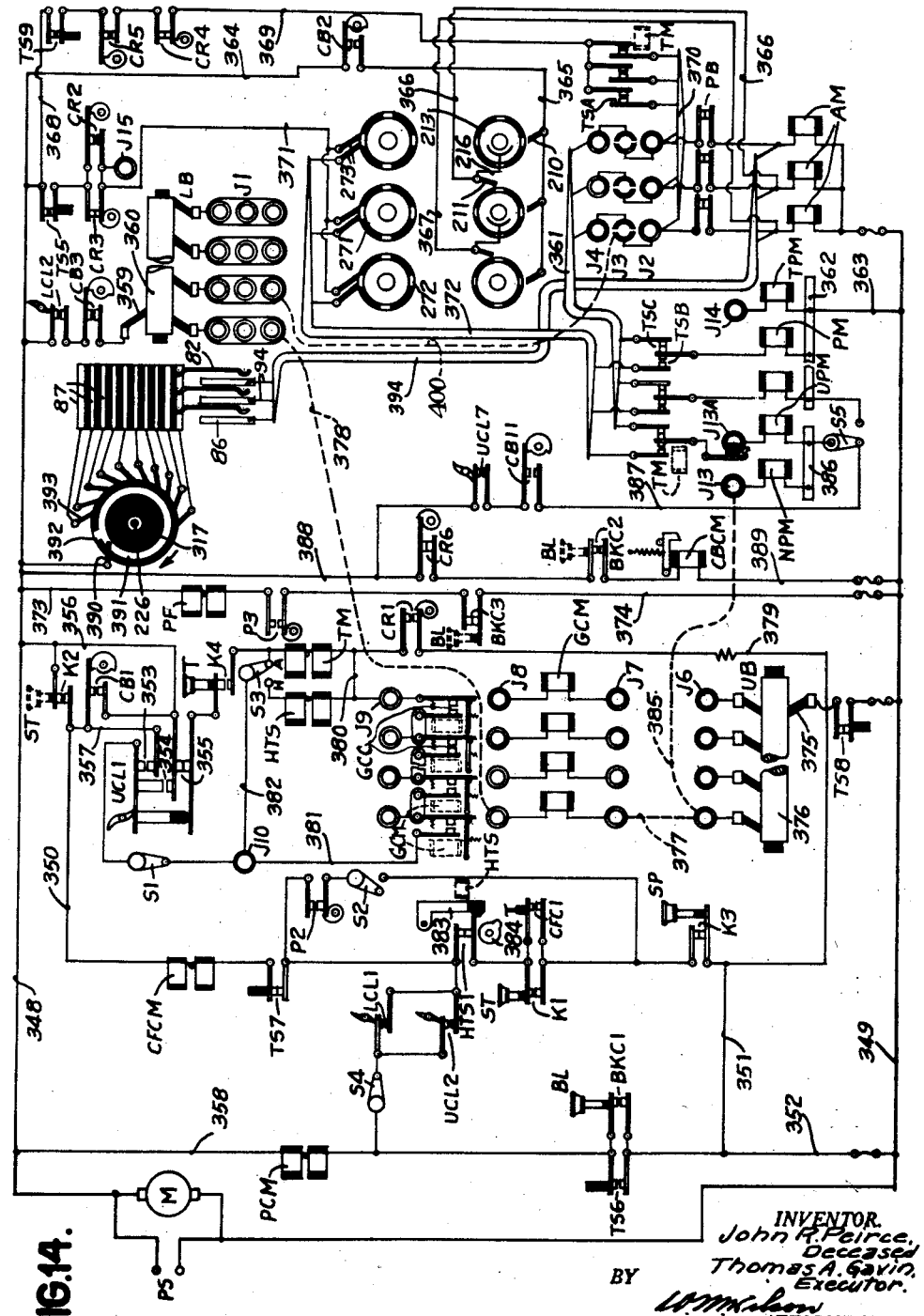

Patented June 2, 1942

2,285,353

UNITED STATES PATENT OFFICE 2,285,353

CALCULATING MACHINE

John R. Peirce, deceased, late of New York, N. Y., by Thomas A. Gavin, executor, Binghamton, N. Y., assignor to International Business Machines Corporation, New York, N. Y., a corporation of New York Original application May 9, 1933, Serial No. 670,114. Divided and this application June 17, 1938, Serial No. 214,301

11 Claims. (C. 235—60)

This application is a division of the copending application Serial No. 670,114, filed May 9, 1933, and issued as Patent 2,172,071.

This invention relates to devices for setting up and entering balances in a tabulating machine.

An object of the invention is to provide an improved form of data set up and entering device of the ten key operated type. The data set up may be printed by operation of the tabulating machine.

Another object is to disclose means for setting up electrical connections to control the accumulating operation of a tabulating machine.

Another object of the present invention is to adapt a tabulating machine for the reception of data set up on a keyboard.

Another object of the invention is to provide a key construction which insures the full depression and restoration of each key of a series of keys used in setting up data for entry in a tabulator.

The ten key mechanism in the machine comprises a differential mechanism for setting a series of rack slides, one at a time, to represent the numbers of the depressed keys. Each rack slide carries a pair of contacts, one adapted to contact with a common contact bar and the other settable opposite any one of ten impulse carrying bars. Normally the contacts are out of touch with the bars, but at the proper time the bars are rocked into cooperation with the adjusted contacts.

The adjusting arm of the differential mechanism is conveyed across the machine on a carriage which moves step by step as the keys are operated. Tabulating stops may be arranged to locate the carriage in predetermined columnar positions. The carriage may be stepped by a space key and restored by a carriage return lever which also serves in back-spacing.

After the rack slides are adjusted, they are latched in position by individual pawls cooperating with the rack teeth. The same teeth mesh with a sector carrying an indicating segment which exhibits the data set up through a window in the case. If the operator notes that any digit in the data is incorrect, he may operate an error key to disengage the pawl holding the slide in that particular column; and then the slide may be adjusted again by the proper key. If it is desired to erase the entire set up, a bail which cooperates with a series of latches pivoted on said pawls, may be operated to release all the rack slides. Finger pieces are provided for each of the latches so that they may be lifted out of the path of the bail if it is desired to repeat any part of the data set up.

The keyboard is operated to set up the old balance appearing at the end of the list of amounts recorded on the ledger sheet placed in the tabulating machine. Then a balance key is depressed to run the tabulating and direct impulses through the ten bars in the set up device and through the accumulators in the tabulator in accordance with the number set up on the keyboard. Thus, the balance is added in the tabulator.

Next, the tabulator is started in regular listing operation to add and record the items represented on the perforated cards. As each card is sensed the amount thereon is added in the accumulator and printed on the ledger sheet with accompanying identification data such as date, operator's number, name, etc. Thus, the new items, added by means of the tabulating devices, are added to the balance inserted by means of the keyboard controlled devices.

Before each card is sensed for addition and item printing, it is sensed to record the group number or ledger number. This number may be printed on a separate strip of paper or in a separate column on the ledger sheet. Thus, with the entry of data of each item there is printed the identification of the following item.

When the last card of a group appears in the tabulator and a group change occurs, the data on the last card is added and recorded, the group number of the first card of the incoming group is recorded, and the machine is conditioned for a total taking operation. After the total is printed and the ledger sheet is removed from the tabulator, another ledger sheet is inserted corresponding to the group number printed with the last item of the previous run. The keyboard is operated to set up the old balance and the cycle of operation outlined hereinbefore is repeated.

Other objects and advantages of the present invention are noted hereinafter in the description and drawings which form part of this specification.

In the drawings:

Fig. 1 is a side elevation view of the tabulator with the keyboard mechanism attached thereto.

Fig. 2 is a detail view of the clutch connections and contacts which are operated for balance entry.

Fig. 3 is a sectional elevation view of the ten key keyboard data entering devices.

Fig. 3a is a front elevation view showing the details of construction of the escapement pawls, the carriage frame and the back space mechanism.

Fig. 3b is a side elevation view of the carriage frame and the escapement pawls assembled thereon.

Fig. 4 is a detail view of the error key mechanism.

Fig. 5 is a detail view of one of the numeral keys and the cooperating depression control devices.

Fig. 6 is a view of sample records; the one being a ledger sheet and the other a strip for receiving ledger numbers.

Fig. 8 is a plan view of the key controlled differential mechanism and the column selecting carriage.

Fig. 12A is a detail view of the transferring devices in the accumulator.

Fig. 14 is a wiring diagram of the machine.

Figure 7:
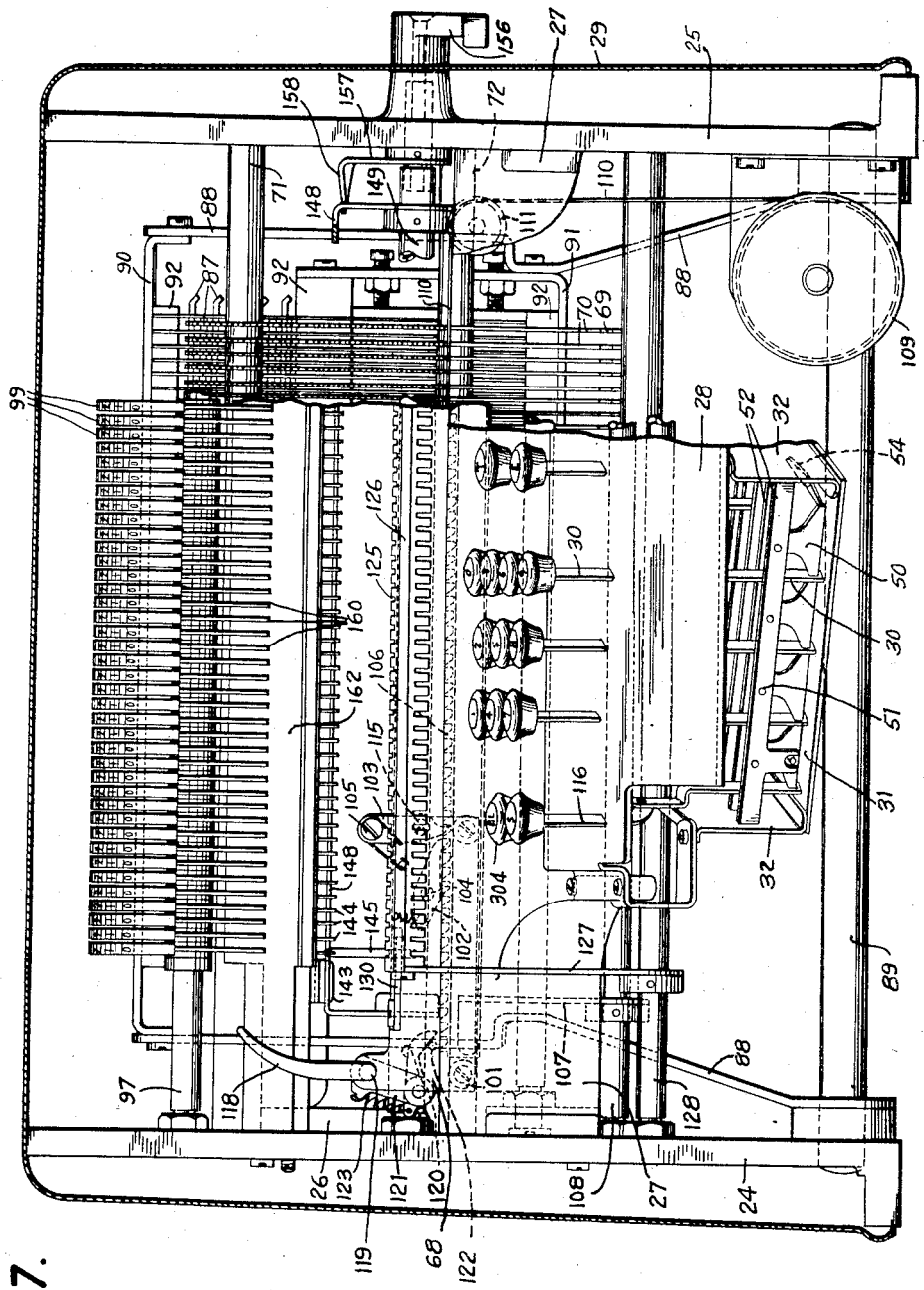
Fig. 7 is a front elevation view of the data entering mechanism with a section of the case removed and other parts broken to reveal the construction.

The keyboard or data entering mechanism is attached to the tabulator by means of brackets 21 and 22, Fig. 1, secured to the base 23 of the tabulator. The two main side frames 24 and 25, Figs. 3, 7, and 8, of the entering mechanism are supported on the brackets and carry between them many operating shafts, and castings 26 and 27, Fig. 3, forming ways for a carriage and support for the upper frame 28 of the keyboard. A case 29 covers most of the mechanism except for openings through which various levers extend for manipulation.

The keyboard comprises a set of ten numeral keys and four special keys as shown in Figs. 7 and 8. The stems 30 of the keys are guided at the upper end in the upper frame 28, and at the lower end are located by slots in a plate 31 which is secured to frame 28 by means of side pieces 32.

Referring to the detail view in Fig. 5, it is noted that the side of a numeral key stem 30 is cut with two sets of oppositely facing ratchet teeth 33 and 34. Cooperating with the ratchet teeth are a pair of pawls 35 and 36 which are pivoted on a rod 37 supported between bars 38 secured to the underside of frame 28. A spring 39 between the pawls, urges them into engagement with the teeth, but one or the other of the pawls is held out of engagement by a three-armed lever 40 pivoted on rod 37. The overturned end 41 of lever 40 cooperates with shoulders 42 and 43 cut in the side of the key stem; and the lugs 44 and 45 on lever 40 cooperate with pawls 35 and 36 respectively, so that when the key is fully raised, the lever is rocked clockwise, holding out the upper pawl and permitting the pawl 36 to engage the upwardly facing ratchet teeth 34, thereby preventing partial depression and retraction of the key. When the key is fully depressed, shoulder 42 strikes lever 40 and rocks it counterclockwise, pushing pawl 36 out and bringing pawl 35 into engagement with the downwardly facing teeth 33. Then if the key is partly raised, the pawl 35 prevents depression. Thus, a numeral key must be fully depressed and fully restored for each digit entering operation.

An over-center device holds the lever 40 in either of the two operated positions. The pointed end of a pear-shaped detent 46 fits into a hole in the overturned end 41 of lever 40. The detent is placed in a circular hole in a bar 47 and is free to oscillate therein about the large end which is contacted by a leaf spring 48 on the bar. The spring urges the detent forward and tends to hold the lever 40 in a raised or lowered position, thereby conditioning either pawl 36 or pawl 35 for operation.

Figure 9:
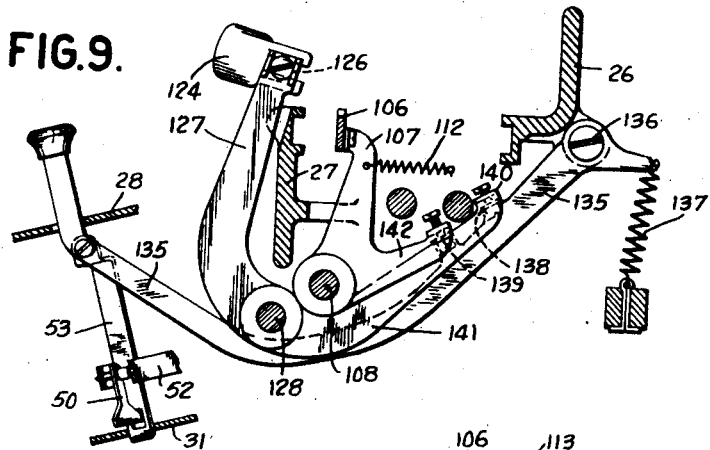
Fig. 9 shows the tabulating key controls which form part of the data entering means.
Figure 10:
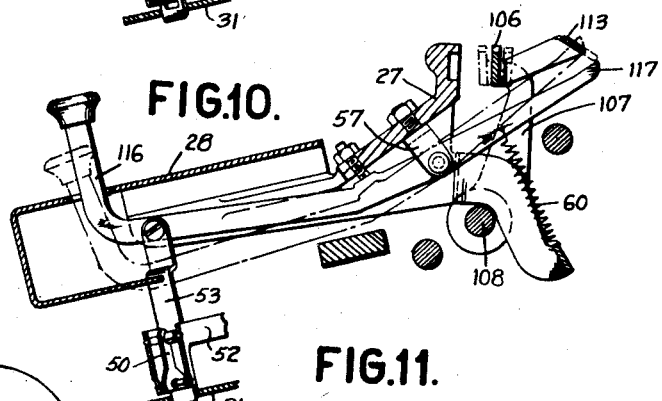
Fig. 10 is a detail view of the spacing key devices.

A single key interlock prevents the operation of more than one of the fourteen keys (ten numeral keys and four special keys) at a time. Once a key is depressed a slight amount, all the other keys are locked until said key is fully depressed and restored. The end of each key stem 30 is cut out to form a slot 49 (Fig. 5) the upper edge of which cooperates with cam faces on pendants 50 mounted on trunnions 51 pivoted between bars 52 secured to side plates 32. In Fig. 7 it is evident that the pointed sides of adjacent pendants 50 abut each other through the openings 49 in the keys, so that when a key is depressed and the two pendants (one pendant in the case of keys at the sides) cooperating therewith are rocked, the motion thereof is communicated to all of the other pendants. Thus all the pendants, except those cooperating with the depressed key, are moved to a position wherein the pointed ends obstruct and prevent downward movement of the other keys until the depressed key is restored to the normal position. The special keys, Figs. 4, 9 and 10, are provided with stems 53 shaped to conform with the ends of the numeral key stems 30, and it is through these stems 53 that the special keys are equipped to cooperate with the interlocking pendants. The pendants are mounted between the keys, and the pendant at the end of a row cooperates with a two-armed lever 54, Fig. 7, which transmits the motion from one row of keys to the next row. Depression of one key moves all the pendants under the upper edges of slots 49 on all the other keys and stems 53.

Each of the numeral key stems 30 is cut with a notch 55, Figs. 3 and 5, to receive one end of a differential lever 56. The levers are pivoted on studs 57 secured to casting 27, and at the right end, Fig. 3, have operating faces 58 adapted to cooperate with pins 59 arranged at differential distances away from said faces. Springs 60 hold and restore the key stems and levers 56 in normal position. The pin 59 cooperating with the lever 56 operated by the 9 key, is in contact with the face 58 and therefore will partake of the full movement of the key; while the other pins vary in distance from their respective operating faces 58, the pin for the 0 key being farthest from the cooperating face 58 on the zero lever 56. The pins are mounted on arms 61, Fig. 8, secured to a shaft 62 carrying a pair of arms 63 between which a slotted bar 64 is swung. Thus, the bar 64 is raised a differential distance depending on which key of the ten numeral keys is depressed.

An operating arm 65, Figs. 3 and 8, extending through bar 64 is adapted to be moved by the bar at any position along the slot. This arm is slidably mounted on a shaft 66 and is moved along the shaft by a pair of spaced extensions 67 on a carriage 68, the movements of which are described hereinafter.

The end of the arm 65, Fig. 3, extends into a slot 69 cut in the side of a rack slide 70 which is guided for vertical movement on slotted shafts 71 and 72. A number of such slides 70 are mounted side by side, one for each order or bank of the data entering mechanism. The operating arm 65 is adapted to lift one after another of said rack slides into a numeral registering position. The lower ends of the slides 70 are located and guided by a groove in a bar 73.

The carriage 68 moves the arm 65 from the left side of the machine, Fig. 8, towards the right in setting up a number. When a numeral key reaches the end of its downward movement, and a slide 70 is brought into adjusted position by arm 65, the carriage escapes one column space, and arm 65 is shifted to the right and contacts the side of a division plate 95 before cooperating with the next slide 70. A leaf spring 74, Figs. 3 and 8, yieldingly holds the arm 65, which is loose on a block 75 between extensions 67, against the division plate as the arm is lowered, until the end of the arm arrives opposite the slot 69. The arm 65 then snaps over to engage the next slide and is ready to adjust the same when any numeral key is depressed.

A series of pawls 76, Fig. 3, one for each slide 70, are pivoted on a rod 77 and cooperate with the rack teeth 78 on the side of the slides 70 to hold them in adjusted position. An operating link 79 is pivoted on each of the pawls 76 and serves to operate the pawls and release the slides at the end of an operation. A spring 80 holds the pawl against the rack. The links 79 are operated also to cause repeating and correction of data settings in a manner described hereinafter.

Each of the rack slides 70 carries an insulation block 81, Fig. 3, to which is riveted a spring metal conducting member 82 carrying a pair of contacts 83 and 84. A spring 85 is fastened between the block 81 and a portion of the machine frame and tends to restore the slides 70 when they are released by pawls 76.

The lower contact 84 is adapted to cooperate with a vertical contact strip 86, and the upper contact 83 may be brought into touch with any one of ten horizontal conducting bars 87 mounted above strips 86 and insulated from each other. The contacts 83 and 84 are normally out of engagement with the bars 87 and strips 86, contact being made only after all the slides are adjusted and the tabulating portion of the mechanism is adapted to receive the data set up. The bars 87 and strips 86 are carried between a pair of levers 88, Figs. 3 and 7, pivoted on a shaft 89. A pair of cross bars 90 and 91 are secured to the levers 88 and between them hold the conducting bars, the strips, and the insulation bars 92. To the ends of the bars 87 are attached wires leading to an emitter for directing timed impulses through said bars in synchronism with the operation of the tabulating accumulating mechanism. A plug connection 93 is made to each contact strip 86 by a wire 94 leading to an accumulator control magnet. The electrical control of the contact devices shown in Fig. 3 are described more fully hereinafter with reference to the wiring diagram.

The machine is provided with devices for indicating the data set up, so that correction may be made before entry. The rack 78, Fig. 3, on each slide 70 cooperates with a gear segment 96 pivoted on a shaft 97. The segment is formed with a sector 98 having a flange 99 upon which numerals are impressed. The flange moves near a horizontal window 100 in the case 29 through which is exhibited the numerical setting of all the slides.

The carriage 68 mentioned hereinbefore is moved step by step under control of the keys in order to move the arm 65 into cooperation with one after another of the slides 70. Rollers 101 pivoted on the carriage 68 are confined in ways cut into the castings 26 and 27. A pair of pawls 102 and 103, Figs. 3, 7 and 8, are pivoted at 104 and 105 on the carriage and depend into engagement with a rack 106 mounted on a pair of arms 107 pivoted on a shaft 108.

The carriage is urged to the right along the rack 106 by a spring drum 109, Fig. 7, connected by a band 110 drawn over a pulley 111 and fastened to the carriage. A spring 112, Fig. 9, normally holds arms 107 back, with rack 106 in engagement with pawl 102; however, on the depression of any numeral key, the face 58 of the corresponding lever 56, Fig. 3, strikes the rear end of a cross-bar 113 extending from the arms 107. The cross-bar is positioned so that it is struck by any lever 56 only after the pin 59 is aligned with a concentric slot 114 in the end of the lever 56. Thus, the differential movement imparted to the arm 65 by the lever 56 is completed before the carriage escapement is effected.

The carriage is allowed to move one step when the rack 106 moves out of engagement with pawl 102, Fig. 3, into engagement with pawl 103, and then back to normal position again. The end of pawl 102, Fig. 7, is fixed with respect to horizontal movement along the carriage, but the end of pawl 103 is movable by means of a pin and slot connection 115 to the carriage to allow a step of movement of the carriage when a rack tooth comes into engagement with pawl 103.

A device is provided to space the carriage one step when it is desired to move the same without operation of a numeral key. The space key lever 116, Fig. 10, is pivoted on a fulcrum bracket 57 and has an end 117 cooperating with the cross-bar 113 just as a numeral lever cooperates therewith. The dotted line positions of the key shows how the rack 106 is moved forward to allow the carriage 68 to escape when the space key is depressed.

A combination carriage return and backspacing device is provided to move the carriage to the left, Fig. 7. A lever 118 is pivoted at 119 on a pair of ears extending upwardly from the carriage 68. The end of the lever extends out of the case as shown in Fig. 3. If this lever is grasped firmly and urged to the left, the carriage 68 may be moved along to the desired position.

When the lever 118 is rocked counterclockwise about the pivot 119, a pawl 120, on an arm 121 secured to the shaft of the lever, engages a tooth on the rack 106 and shoves the carriage 68 one step to the left in a backspacing movement. The pawl 120 is normally held out of engagement with the rack 106 by a pin 122 on carriage 68, against which pin the pawl is pressed by a spring 123. As the carriage is moved toward the left for back spacing, pawl 102 ratchets over one of the teeth on rack 106 and then holds the carriage in adjusted position when the back space pawl 120 is disengaged.

The carriage movement may be controlled by a

these shafts will also rotate continually, thereby turning the actuating elements of the accumulating devices with which they are related and which are more fully described hereinafter.

At both ends of shaft 170 are clutch devices adapted upon energization of a magnet CFCM, Fig. 14, to form a driving connection at one end to a card feeding device, and energization of magnet PCM, Fig. 1, causes connection to a printing mechanism at the other end. The driving mechanism is shown in greater detail in Patent No. 2,042,324 mentioned hereinbefore.

A number of can contacts are mentioned hereinafter with reference to the wiring diagram. These contacts are operated by cams on the shaft 170 and the card feed shaft clutched thereto. The CR contacts are operated by cams on the constantly running shaft 170 and the CB contacts are actuated by the card feed shaft only during the feeding of records.

The regular Hollerith form of perforated record cards are used, with single perforations located differentially to represent a number.

The cards are fed singly, first under an upper set of perforation reading brushes UB, Fig. 14, and then one cycle of operation later, they pass under the lower set of brushes LB. As they pass they operate upper and lower card lever contacts to control operation of the machine.

Figure 12:
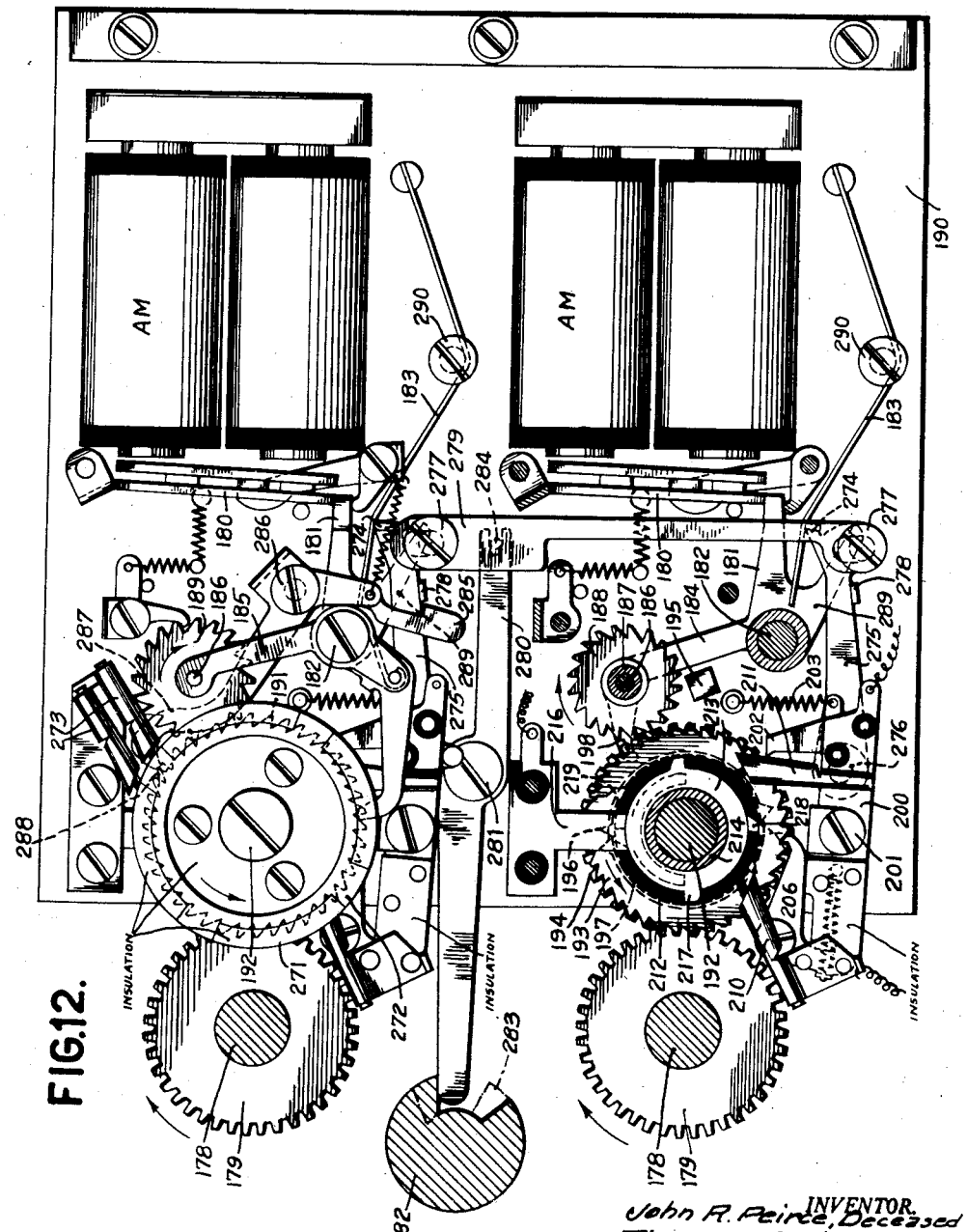
Fig. 12 is a side view, partly in section, of two orders of the accumulating devices.

The record card passes under the lower brushes LB in synchronism with the rotation of shaft 178, Fig. 12, so that when a perforation is sensed by the lower brush at a time determined by the location of the perforation, an accumulator magnet AM is energized to actuate the accumulator to enter the amount therein.

The energization of magnet AM attracts armature 180, moving it to the right (Fig. 12) and thereby unlatching arm 181 of an assembly pivoted on stud 182 and normally urged counterclockwise by a spring 183. Therefore, when armature 180 releases arm 181, the assembly is rocked slightly in a counterclockwise direction. The assembly includes a pair of upwardly extending parallel arms 184 and 185 in the upper ends of which is fixed a rod 186. A sleeve 187 carrying a pair of pinions 188 and 189 is free to rotate on rod 186. These pinions serve to connect the driving means to the accumulating gear.

In Fig. 12, two complete adding units are shown mounted on a common plate 190. The lower unit is similar in structure to the upper unit and is illustrated with several parts removed to more readily convey an understanding of the operation of the accumulating devices.

The pinion 189 is constantly in mesh with an accumulating wheel gear 191 which is loose on a stud 192 on plate 190. The other pinion 188 is aligned to mesh with an actuating gear 193 whenever the assembly is carried to the left. Gear 193 is loosely pivoted on stud 192 and is attached to a driving gear 194 which is in mesh with gear 179 which, as already explained, is mounted on the constantly turning shaft 178.

With the above-described construction in mind, the differential operation of the accumulator may be understood. When the sensing brush encounters a hole in the record car, magnet AM is energized, armature 180 releases arm 181 permitting the assembly to rock until arm 184 rests against stop 195. This movement of the assembly engages pinion 188 with gear 193 and adapts the pinion to rotate in synchronism with said gear, thereby causing pinion 189 and accumulating gear 191 to rotate also in synchronism therewith. The rotation continues until the zero point in the cycle when a projection 196 on a constantly running cam 197 strikes the finger 198 projecting from the upper end of arm 184, thereby rocking the pinion assembly clockwise, disengaging the pinion 188 from gear 193, and permitting armature 180 to latch arm 181 again. The accumulator gear 191 is proportioned to represent four series of digits so that one quarter of a revolution of the gear is a complete adding cycle of ten units of movement.

The accumulator unit is adapted to start to rotate at different times in the cycle depending on when the impulse is received from the card sensing brush, and the rotation of the accumulator gear is interrupted at a fixed point in the cycle by cam projection 196, thereby rotating the accumulating gear an amount proportional to the value of the digit represented by the perforation in the record card.

After the adding portion of the machine cycle is completed, there may still remain a transferring or carrying operation to be performed. That is to say, if any accumulator wheel has been turned to, or through, zero during the adding portion of the cycle, it is necessary to advance one or more adjoining higher order wheels one step in order to show a correct result. If the next higher order wheel or wheels register a digit "9," it is necessary to advance all said wheels one step as well as advancing the first wheel to the left of the "9" wheels.

Fastened to each accumulating gear 191, Fig. 12, is a disk 199, Fig. 12A. The gear and disk are proportioned so as to make only one fourth of a revolution for each ten digits or steps of accumulating movement. Associated with each disk 199 is a lever 200 pivoted at 201 and having a finger 202 urged by spring 203 to bear on the periphery of the disk. While the disk 199 is registering the digits 1 to 8 inclusive, finger 202 rests on a concentric portion of the periphery, but when the disk registers "9," the finger drops into a notch 204. When the disk turns still further to "10" or "0," a cam point 205 forces lever 200 to the position shown in Fig. 12A where it is held by a latch 206 engaging a catch plate 207 on lever 200. Latch 206 is pivoted at 208 and drawn towards latching position by a spring 209.

Mounted on an insulating block on the left end of lever 200 is a brush 210 carrying a wire which serves to connect it to the electric circuit of the machine. Fastened and insulated on the other end of lever 200 is another brush 211 also connected to the electric circuit.

An insulating bushing 212 carrying a metallic ring 213 is mounted on sleeve 214 for rotation on stud 192. The ring is grooved to receive a contact plate 216 the lower end of which is arc-shaped, as shown in Fig. 12. The plate 216 is insulated from the machine and wired to the machine circuit.

Extending from the periphery of ring 213 are four equally spaced contact projections. The two diametrically opposed projections 217 are arranged to contact with brush 210 and the other two projections 218 in another plane are located to contact with brush 211.

The transferring devices are arranged so that if an accumulator gear moves to or through "0" during adding operation, the brush 210 is moved to contact a projection 217 and direct an impulse through plate 216 to the magnet AM of the next higher order. Should an accumulator disk be registering "9" when such an impulse is initiated, the brush 211 is in position to contact projection 218, and the impulse is carried through brush 211, ring 213 and plate 216 to the still higher order.

The transferring impulses are initiated near the end of of the adding cycle, after cam 196 passes finger 198. If a transfer impulse is directed through a magnet AM, the pinion 188 again engages gear 193 and is cammed out by cam point 219 after moving one step. At the end of each adding cycle, a constantly running cam 220 operates latch 206 to release lever 200 if it should be latched up. The transfer operation is then complete and the accumulator is ready to begin another cycle. The transferring control is described further hereinafter with reference to the wiring diagram in Fig. 14.

The machine contains devices for printing the data accumulated. When such printing operation is desired, a printer clutch magnet PCM, Fig. 1, is energized. This magnet operates an armature latch arm 221 which then releases a pawl 222 and connects the printer driving gear 223 to the rotating shaft 170. The gear 223 meshes with an idler gear 224 which in turn meshes with another gear 225 on the printer drive shaft 226. The printer shaft carries a number of cams for operating the printing mechanism.

Figure 13:
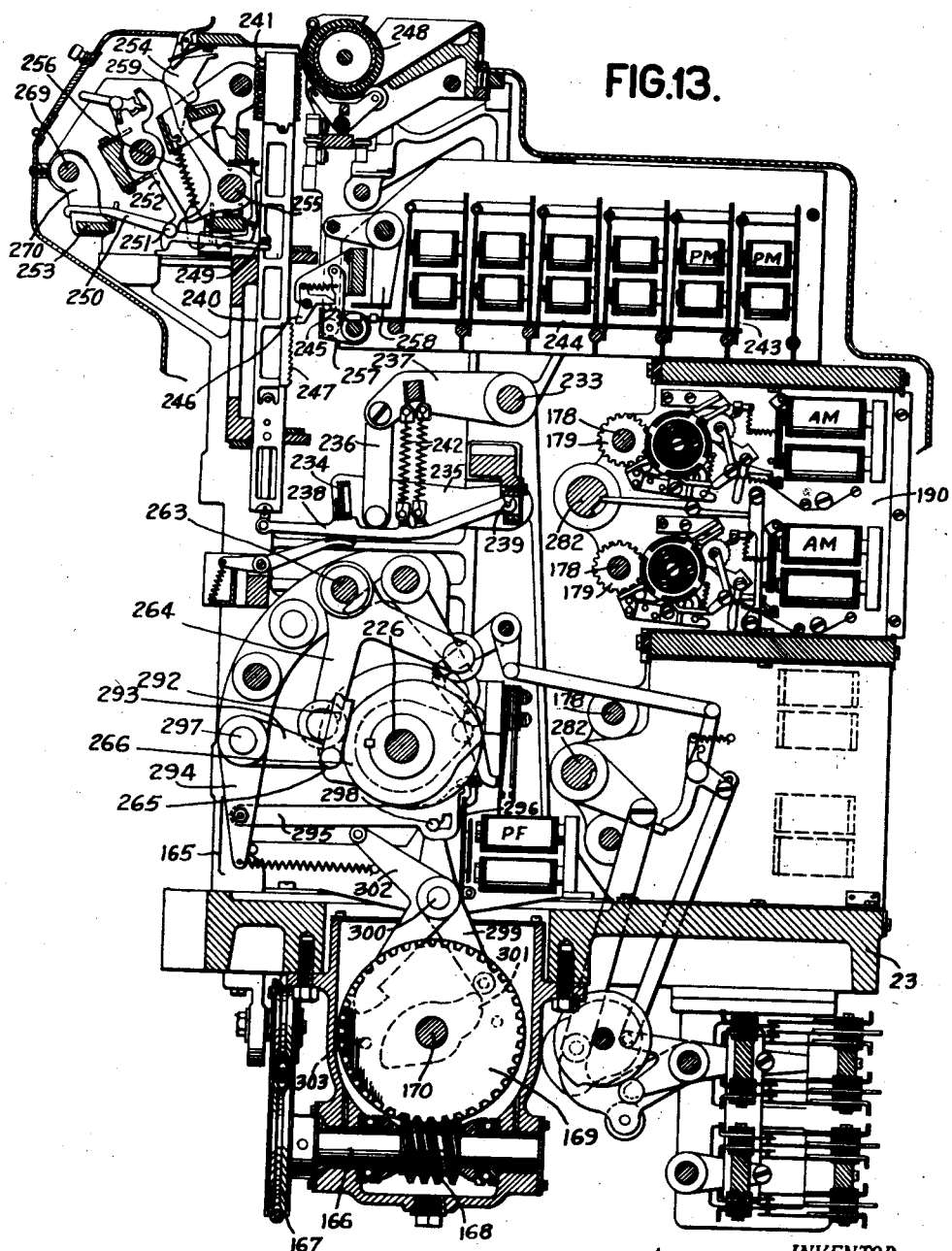
Fig. 13 is a sectional elevation view of the tabulator, and shows the main operating mechanism, the printing mechanism and the accumulating devices.

A pair of complemental cams 227 and 228 cooperate with a two armed lever 229 pivoted at 230 and connected by link 231 to an arm 232 fastened to shaft 233. Turning to Fig. 13 it is noted that shaft 233 operates a bail 234 comprising arms 235 by means of links 236 articulated to the arms and levers 237 fastened to shaft 233. The cross bar of the bail cooperates with a series of levers 238, one for each order, pivoted at 239. At the other end each lever carries a type bar 240 with the type 241. Springs 242 urge the restoring levers 238 into cooperation with bail 234 as it is raised.

The bail 234 is moved in synchronism with the feeding of the record card so that if a perforation appears in any column on the card, the related type bar may be stopped in a position to print a character representing the perforation.

The type bars 240 are stopped or located under control of printing magnets PM, Fig. 13. During listing, at the same time that an impulse is directed through the adding magnet AM, another impulse is sent through magnet PM which then attracts an armature 243 which pulls call wire 244, releasing latch 245 and allowing a pawl 246 to drop into a certain one of the series of notches 247 in a block on type bar 240. Thus each type bar is positioned under control of the perforated record to present the proper type 241 opposite the platen 248. The pawl 246 and the latch 245 are restored by bails 257 and 258, respectively, which are rocked late in the operating cycle.

As each type bar rises, a pin 249 thereon moves away from a lever 250 allowing it to rock counterclockwise about a pivot 251 on the hammer retaining member 252. The front end of lever 250 is shaped as a hook and adapted to engage bail 253 which then pulls member 252 off a shoulder on hammer 254 and allows the same to rock on shaft 255 and strike a type 241 under the propulsion of spring 256. The record is impressed on a sheet carried around the platen 248.

The hammers 254, Fig. 13, are restored by a bail 259 comprising arms secured to shaft 255. A bell crank 260, Fig. 1, is attached to shaft 255 and connected by a link 261 to an arm 262 on shaft 263 which carries a two-armed lever 264, Fig. 13. The lever carries a pair of rollers which cooperate with cams 265 and 266 on shaft 226. Late in the printing cycle, the hammers are restored through the connections noted. At the same time the bail 253, Fig. 13, is restored by a link 267, Fig. 1, connected at one end to bell crank 260 and articulated at the other end on an arm 268 fast to shaft 269 which carries the arms 270 of bail 253. Early in the operation, the bail is operated by the same connections to release the hammers for striking as noted hereinbefore.

The machine may be conditioned to take a total by energizing magnet TM by hand upon manipulation of a total key, or automatically upon group changes under control of a form of group control devices described hereinafter with reference to the wiring diagram.

When the total taking devices are operated, certain contacts are shifted to connect the printing magnets to accumulator reading brushes instead of the card sensing brushes. On totals, the magnets AM are energized early in the operating cycle to engage pinions 188, Fig. 12, with driving gears 193 and start the accumulator gears 191 rotating. Secured to each accumulator gear 191 is a commutator 271 with four conducting spots 272 which are adapted to form an electrical connection between two totaling brushes 273 as the accumulator wheel arrives at the zero position. The time in the cycle at which the spots appear under the related brushes 273 depends on the total amount registered in the wheels which is evidenced by the distance between the spots and the brushes before the taking of a total. As the type bars 240, Fig. 13, are rising in synchronism with the rotation of commutators 271, when an impulse is carried through the brushes 273 to the related printing magnets PM, the bars are stopped in positions to present the proper type 241 for printing a number equal to the total amount read off the accumulator.

Devices are provided to disengage the pinion 188, Fig. 12, when the accumulator wheel reaches the zero position, so that the accumulator is cleared and ready for the entry of a new series of items.

The spring 183 tends to rock the assembly comprising arms 184 and 185 in a counterclockwise direction during item entering. The end of the spring is urged in such a direction by a fulcrum block 274 under the spring. This block is part of an arm 275 pivoted at 276 and having a stud 277 and a projection 278. The arm 275 is held up by a link 279 which is slotted to receive stud 277. The link is held in position through connection 284 by a lever 280 pivoted at 281 and cooperating with a shoulder on a notched shaft 282. The shaft 282 maintains the position it is shown in on Fig. 12 during item entering operations. When a total is to be taken, the shaft is released to assume the dotted line position 283. Then the lever 280, link 279 and arm 275 are released, the fulcrum block 274 is not supported throughout the operation by link 279, but depends on the support of a latch 285 which engages under projection 278 and holds up the arm 275.

The latch 285 is pivoted at 286 and is formed with an upper actuating arm 287 which cooperates with any one of four cam extensions 288 on a cam secured to accumulator gear 191 and commutator 271. As the accumulator gear reaches a zero position the extension 288 rocks latch 285 in a clockwise direction, releasing arm 275, lowering fulcrum block 274 to rest on the lower arm 289 of the assembly and allowing spring 183 to act in a counterclockwise direction about stud 290. Thus, the pinion assembly is rocked in a clockwise direction and latched by armature 180. The accumulator gears 191 remain in the zero position ready for a new series of operations.

Between operations of the printing mechanism, the platen 248, Fig. 13, is moved to feed the paper sheet. The usual form of ratchet gear and pawl is used, the pawl being moved by a linkage comprising arm 291, link 292, Fig. 1, and arm 293, shaft 297, arm 294 and link 295, Fig. 13. Link 295 is normally held out of operative position by the armature 296 of paper feed magnet PF. When the magnet is energized, the link is allowed to lower so that a notch therein engages a stud 298 on an oscillating lever 299 pivoted at 300 and operated by cam 301. At the proper time the lever 299 reciprocates link 295 and thereby, through the connections pointed out above, shifts the platen to feed the paper. The link 295 is restored by lever 302 operated by pin 303 on gear 169.

After a data setting is made on the keyboard shown in Figs. 3, 7 and 8, a balance key 304, Figs. 1, 7 and 8, is operated to enter the data in the tabulating mechanism. The devices operated under control of the balance key are best shown in Figs. 1 and 2. The bottom of the balance key 304, Fig. 1, is pivotally connected to an arm 305 of a lever pivoted at 307 on a bracket 306. Another arm 308 of the lever is attached to a link 309 the other end of which is connected to a clutch latch 310, Fig. 2, pivoted at 313. When the balance key is depressed the link 309 is moved to the left and latch 310 releases a clutch pawl 311 which then engages a notched disk 312 on the shaft 226.

The pawl 311 is pivotally mounted at 314 on a plate 315 secured to a cam 316 all of which are loosely mounted on shaft 226. This shaft is turned in synchronism with the raising of the type bars and the turning of the accumulator driving gears, and forms the mounting for an impulse emitter 317, Fig. 14, which is described hereinafter. Therefore, when clutch pawl 311 locks with disk 312, the cam 316 is connected to move in synchronism with the tabulating mechanism.

The cam 316, Fig. 2, cooperates with a roller 318 on an arm 319 pivoted on shaft 89, Fig. 1, and connected to the levers 88 forming a frame for the conducting bars 87, Fig. 3. At the proper time a rise on cam 316 lifts arm 319 and rocks levers 88 counterclockwise, Fig. 3, placing the bars in touch with contacts 83 and 84, ready for the directing of timed impulses through bars 87, members 82, strips 86 and thence through the accumulating magnets AM. The levers 88 are allowed to move again to inoperative position after data entry, by a drop on cam 316. A spring 320 keeps the arm 319 in cooperation with the cam.

When the latch 310 is moved to the left, Fig. 2, by link 309, it is held in that position by a lever 321, the end of which engages a shoulder 322 cut in the latch. The lever 321 is pivoted at 323 on a bracket 324 and is urged into cooperation with latch 310 by a spring 325 on the bracket. Near the end of a cycle of operation, a pin 326 on plate 315 strikes lever 321 and moves it to free latch 310 which then rocks into position to catch the end 327 of pawl 311 as it finishes one complete revolution. The shoulder 328 on latch 310 first engages pawl 311 to rock it away from disk 312. Then an extension 329 on plate 315 is stopped by the shoulder 328 and held up by a pawl 330 on latch 310.

When the latch 310 moves to the left it serves to actuate contacts for controlling various functions associated with balance entering operations. An insulation block 331 is secured to the latch 310 and has an end cooperating with one leaf spring of contacts BKC3. The block also has a shoulder 332 cooperating with the ends of two contacts BKC1 and BKC2. As the latch moves to the left, contact BKC3 is opened and contacts BKC1 and BKC2 are closed for purposes which are fully described hereinafter with reference to the wiring diagram.

Figure 11:
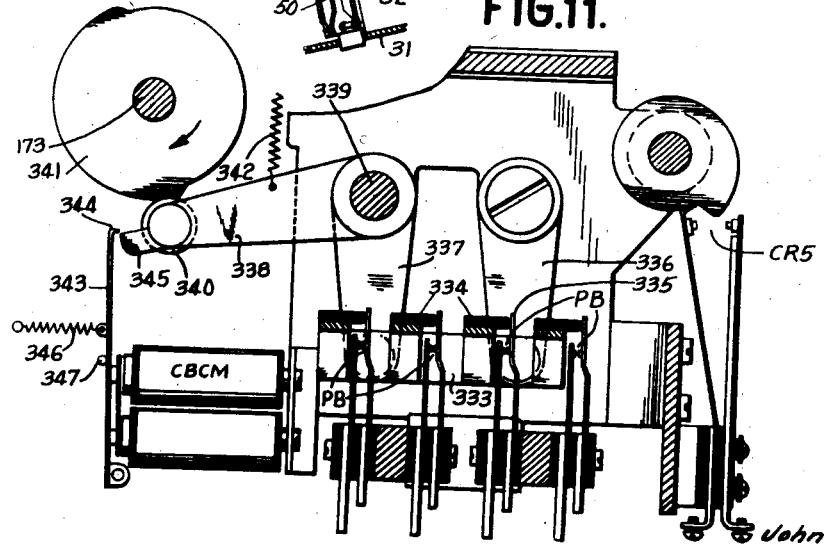
Fig. 11 is a sectional elevation view of the devices controlling the operation of the contacts for preventing back circuits during balance entry.

In Fig. 11 there is shown a contact closing control device which cooperates with a series of contacts PB. These contacts are held open to prevent back circuits when impulses are directed through the accumulator magnets AM on carrying and balance entering operations. The contacts are opened by frame 333 carrying a series of insulation bars 334 which cooperate with the ends of leaf springs 335 forming part of contacts PB. The frame is supported on the ends of two swinging arms 336 and 337, the latter of which is fastened to a cam follower lever 338 on shaft 339. The lever 338 carries a roller 340 in touch with a cam 341 on the continually rotating shaft 173. During the portion of the cycle that impulses are carried to the accumulator magnets from the card reading brushes, cam 341 presents a depression to roller 340, allowing frame 333 to shift to the left under the urging of spring 342 and permitting contacts PB to close. When the transferring or carrying portion of the item entering cycle is reached the cam acts to operate the lever 338, thus shifting the frame 333 to the left and opening contacts PB.

When a balance entering operation is initiated, the contacts PB are held open to prevent an improper direction of the impulses sent out by the emitter. These holding devices comprise a magnet CBCM which, when energized by depression of the balance key, acts to attract its armature 343, moving the same until a hooked end 344 thereon overlies a projection 345 on lever 338. Thus, the lever is prevented from following the depression in cam 341, and contacts PB are held opened. A spring 346 restores the armature against stop 347 when the magnet is deenergized.

Referring now to the wiring diagram in Fig. 14, the operation of electrical controls in the machine may be described.

The closing of a switch at PS sends current around through the two main lines 348, 349 and energizes the motor M.

When the start key ST is depressed contacts K1, K2 will be closed. This will close a circuit from the line 348 through contacts K2, wire 350, card feed clutch magnet CFCM, contacts TS7 normally closed, contacts HTS1 normally closed, contacts K1 now closed, stop key contacts K3 normally closed, wire 351 and wire 352 to the line 349. The energization of the card feed clutch magnet CFCM will cause cards to be fed through the machine. When the cards engage card lever UCL1, contacts 353 and 354 will be closed and contacts 355 will be opened. The start key ST may then be released and the card feed circuit will continue to flow from the line 348 through wire 356, then through contacts 354 and 353, wire 357, wire 350, card feed magnet CFCM, contacts TS7, contacts HTS1, contacts CFC1 which have now been closed by the card feed clutch, then through stop key contacts K3, wires 351, 352 and back to the line. Between cards the contacts 353, 354 will open. Contacts CB1 are timed to close at this time so that the card feed circuit will pass from wire 356 through contacts CB1 to wire 350 and through magnet CFCM, etc.

Card feeding will thus continue and the machine will operate to accumulate and to list the amounts being accumulated, if desired, on a listing sheet.

When the machine is set to take a total, the contacts TS7, which are controlled by magnet TM along with total contacts TS, will be opened to prevent restarting of the card feed while totaling.

If listing is to be effected, the switch S4 is closed. Now when the LCL1 contacts are closed by the cards actuating the lower card lever associated with the contacts, current will pass from line 348 through wire 358, printing clutch magnet PCM, switch S4, contacts LCL1, contacts HTS1, contacts CFC1, K3 and wires 351, 352 to the line 349. After the cards have all run through the machine, card lever contacts LCL1 and UCL1 will operate, contacts 353, 354 will open and contacts 355 will close. Magnet CFCM will become deenergized and card feeding will cease. The printing magnet PCM will also be deenergized by the opening of LCL1 and CFC1. When the total key T is pressed to take a total, contacts TS6 will close to reenergize the printing clutch magnet PCM so that the total may be printed.

Assuming cards to be feeding through the machine, the cards first pass under the upper brushes UB and then under the lower brushes LB. While a card is under the brushes LB the contacts CB3 are closed by their cam. If a perforation appears in any column on the card, when such perforation passes under a brush LB a circuit will be set up through the perforation as follows: from line 348, through the LCL2 contacts which are held closed by the cards while cards are feeding, then through contacts CB3 and through the brush 359 to the common contact roller 360, then through the perforation in the card to the brush LB, then through a plugging wire 400 from socket J1 to the socket J3, then through a wire to contacts PB now closed, through magnet AM to the other side of the line 349.

The energization of magnet AM as we have seen in connection with Fig. 12 causes the accumulator gear 191 to commence to turn to accumulate. It commences to turn at a point in the cycle when a perforation passes under the brush LB and ceases to rotate when the cam point 196 causes the pinion 188 to become disengaged from gear 193. Thus the amount represented by the position of the perforation is accumulated in the adding gear 191. The circuit through the brush LB also effects printing through the following circuit: from the plug socket J3, through cable 361 to contacts TSC normally closed, printing magnet PM, bus bar 362 and wire 363 to the other side of the line 349. The energization of printing magnet PM, as described in connection with Fig. 13, controls the setting of the type carrier 240 to cause printing of the character represented by the position of the hole in the card.

Carrying from one order on the accumulator to the next higher order is effected as follows: if the accumulator wheel 191 of any order passes from nine to zero during an adding operation it will cause the brush 210, Fig. 12A, to rock into position to be later engaged by the projection 217 on commutator ring 213 as already described.

After the accumulator gears have been disengaged the contacts CB2, Fig. 14, are closed momentarily. This closure takes place at the moment when the projection 217 on ring 213 is passing the position of brush 210. If the brush has been rocked so as to be engaged by the segment, a circuit will be closed at this moment from the line 348, through wire 364, contacts CB2, wire 365, brush 210, commutator ring 213, brush 216, wire 366 to magnet AM of the next higher order and then back to the line 349. Thus the accumulator gear of the next higher order will be actuated one step after the cam point 196 has moved the pinion 188 out of mesh.

As soon as a unit has been rolled into the wheels, the cam point 219 will cam the pinion 188 out again so that the accumulator gear wheel 191 again stops having received an additional one. If any accumulator wheel is standing at nine when an additional one is added to it, we have noted that its brush 211, Fig. 12A will be in position to be engaged by the commutator ring 213. This engagement also takes place during the moment that the contacts CB2, Fig. 14, are closed. Thus when current passes from the brush 216 to wire 366 it will also pass on to brush 211, commutator ring 213 of the next higher order, then to brush 216 of that order and out to the next wire 367 and on to the adding magnet AM of the still higher order to cause a unit to be added to said order. Thus if the accumulator wheel of the tens order is standing at nine at the end of an accumulating operation, and the wheels of the units order passes from nine to zero, a unit will be carried into the accumulator wheel of the tens order and through the brush 211 of the tens order into the accumulator wheel of the hundreds order.

To take a total, the total key T is depressed closing contacts K4. This energizes magnet TM as soon as the CR—1 contacts are closed. The TS contacts are then shifted out of normal position to an opened or closed condition when the magnet TM is energized. The total contact shifting mechanism is shown in greater detail in the British patent identified hereinbefore.

Contacts CR—5 and CR—4 are closed momentarily at a definite time after the closing of contacts TSA and a circuit will be set up from the line 348, wire 368, through contacts TS9, contacts CR—5 and CR—4, wire 369, contacts TSA now closed, cable 370, contacts PB, accumulator magnet AM and back to the line 349. This takes place at a time in the operation of the machine corresponding to one step prior to the time that the nine positions on the card would pass under the brushes LB. The accumulators are then all thrown into mesh for operation and will turn through ten steps or, in other words, each wheel will turn to add the value ten unless interrupted at an intermediate point. While the accumulating wheels are thus turning, a circuit is adapted to be closed from the line 348, through contacts TS5, through contacts CR—2 and CR—3, and wire 371 to a brush in each set of brushes 273. Each accumulator gear has a commutator 271 which is secured to it and turns therewith. When a contact spot 272 reaches a position bridging brushes 273, the circuit will continue through spot 272, cable 372, through contacts TSB now closed, magnet PM and back to the line 349. The energization of the printing magnets will set the respective type bars for printing the total. An extra printing magnet TPM may be used to print a total sign during listing operations at which time a plug wire may be connected between plugs J14 and J15. The circuit through magnet TPM may be followed from line 348 through contacts TS5, contacts CR2, plug J15 and wire to plug J14, magnet TPM and wire 363 to line 349. This sign may be omitted when printing a total during tabulating operations.

The position at which a type bar is set will correspond to the value contained in the respective accumulator unit so that the type bars will thus print the value contained in the accumulator. The accumulator gears will be demeshed at the zero position, the grooved bar 282 of Fig. 12 having released the lever 280 to permit the gears 188 to be cammed and latched out, so that the accumulators will be cleared and ready for a new accumulating operation.

If it is desired to re-introduce the total printed into the accumulator for progressive totaling, the accumulator gears 191 are permitted to turn through ten steps of adding movement before they are demeshed. This brings them back to the same relative positions they occupied before the total cycle was initiated. Devices for securing such a progressive total are shown and described in Patent No. 1,939,077, issued December 12, 1933, to A. W. Mills.

At the end of ten steps of movement the cam 196 engages the arm 198 and throws pinion 188 out of mesh with driving gear 193. During such movement in total taking, the notched shaft 282 may be latched against rocking, so that the accumulators will not be separated from the driving gears at the zero position, but will continue to turn until they have turned a distance equal to the value ten, and thus will have returned to the amount registering position.

A platen feed mechanism is provided to feed the record paper before printing in both listing and total taking operations. The platen feed magnet PF, Fig. 14, when energized acts to clutch the platen spacer to the driving mechanism. The circuit through the magnet is as follows: line 348, wire 373, magnet PF, contacts P3 closed before printing, contacts BKC3 closed when not entering balances, and wire 374 to line 349.

As the record cards pass in succession under the upper and lower brushes, each card is compared with the following card to detect a change in group number so that the machine may then be stopped or a total be taken. The group control devices include a number of magnets GCM, each wired in series between corresponding upper and lower sensing brushes. The circuit through one of the magnets may be traced from line 349, contacts TS8, common contact brush 375, roller 376, an upper brush UB reaching through a perforation in a record card, plug wire 377, magnet GCM, plug wire 378, lower brush LB, roller 360, brush 359, contacts CB3 and contacts LCL2 to line 348. As long as coinciding perforations appear in the group number columns on successive cards, the magnets GCM are energized during the card reading cycle. Each magnet cooperates with a contact GCC which is closed when the magnet is energized. The contacts are connected in series so that the opening of any one of the contacts breaks the circuit which controls total taking.

If the cards agree in group number and all contacts GCC are closed a circuit is completed from line 349, wires 352, 351 and 379, contacts CR—1, wire 380, contacts GCC, wire 381, switch S1, upper and lower contacts 353 and 354 and wire 356 to line 348. When the cards disagree as to group number, one or more of the contacts GCC open and the circuit is diverted through magnet TM or magnet HTS according to the setting of switch S3. When a contact GCC is closed by an energized magnet GCM tripping a latch associated therewith, the contact is held closed until the end of a cycle when all contacts are again opened and relatched by a positive means. For a detailed showing of the group control contact tripping and restoring mechanism, reference may be made to the British patent mentioned hereinbefore.

If the switch S3 is positioned as shown, the machine is conditioned to take a total automatically, and magnet TM is adapted to be energized by a circuit from line 349, wires 352 and 351, wire 379, contacts CR—1, magnet TM, switch S3, wire 382, switch S1, contacts 354, and wire 356 to line 348. The magnet TM, when energized, operates various contacts and devices as noted hereinbefore to print a record of the total. Card feeding is automatically restarted by the closing of contacts P2 by the printing operation.

If the switch S3 is positioned to contact the spot H, the machine is conditioned to be stopped when the magnet HTS is energized on a group change. Then a hand operated total may be taken. The circuit through the hand-total stopping magnet HTS may be traced from line 349, wires 352 and 351, wire 379, contacts CR—1, wire 380, magnet HTS, switch S3, wire 382, switch S1, contacts 354 and wire 356 to line 348. The magnet HTS then attracts the armature 383 which is in the form of a latch normally holding the contacts HTS1 closed. These contacts are in line with the print clutch magnet PCM and card feed clutch magnet CFCM so that when they are opened by the movement of armature 383, the magnets are deenergized and the machine stops. It is then ready for the taking of a hand total by the depression of key T with the results noted hereinbefore. The contacts HTS1 are restored late in the total printing cycle by a cam 384 on printing shaft 226.

A printed record of the group number of each card is made as the record cards pass through the machine. In order that the operator may identify an incoming group of cards before the same cards are entering amounts under the lower brushes, the printing of the group numbers is controlled from the upper brushes. Therefore, when the machine is stopped by a group change, a card of the used group has passed under the lower brushes and a card of an unused group has passed under the upper brushes. Then the group number and corresponding ledger number of the incoming group may be noted and the particular old balance amount of said ledger account may be entered before the new items are added thereto. The circuit for printing group numbers may be followed in Fig. 14 from line 349, through contacts TS8, common brush 375, roller 376, upper brush UB, plug wire 385, plug socket J13, numeral printing magnet NPM, bus bar 386, switch S5, wire 387, contacts CB11 closed while the index points on the card are being read, contacts UCL7 closed immediately after a card appears under the upper brushes, and wire 388 to line 348. A number of such magnets NPM may be connected to the upper brushes.

A magnet UPM may be used for group number printing by inserting the end of a plug wire such as wire 385 into the jack J13A and breaking the connection to the total and item printing contacts TSB and TSC. The same magnet may be used for regular item and total printing by leaving the jack J13A closed as shown and moving the switch S5 to connect the magnet to bus bar 362 and line 349. The magnets NPM, UPM and TPM have the same form of connections and exercise the same sort of control over the printing mechanism as that exercised by the ordinary print magnet PM (Fig. 13).

The machine may be stopped after any regular cycle (usually after a total taking cycle) and then the balance key BL may be operated to initiate a data entering cycle to enter the data set up on the keyboard into the tabulator.

Three contacts are operated when the balance key is depressed. The contacts BKC1 are closed to energize the printer clutch magnet PCM. The contacts BKC2 are closed to energize the contact operating magnet CBCM and the contacts BKC3 are opened to deenergize the paper feeding magnet PF.

The circuit through magnet CBCM runs from line 349, wire 389, magnet CBCM, contacts BKC2, contacts CR—6 and wire 388 to line 348. Then the contacts PB, are held open, as explained in connection with Fig. 11, to prevent back circuits during a balance entering operation.

Depression of the balance key BL also causes the contact strips 86 and 87, Fig. 3, to be moved into contact with the settable conducting member 82 as explained with reference to the clutch mechanism in Figs. 1 and 2. The machine is then conditioned to accumulate under control of the impulses sent out by emitter 317 and selected by the setting of members 82. The wiring of the balance entering devices may be traced from line 348 to the emitter brush 390 on a common contact ring 391, then through the ring and a moving contact spot 392 to the ten brushes 393 in succession, wires to bars 87, member 82 placed to contact a certain bar 87 and select a certain timed impulse, contact strip 86, cable 394 and through accumulating magnet AM to the other side of the line 349. As the balance entering operation is completed the strips 86 are moved away from members 82 and the emitter is disabled until the next entering operation is initiated by operating the keyboard. The amounts entered in this way may be recorded by taking a total or a progressive total after the balance entering cycle. Such an operation may be useful in printing an old balance on the first line of a new ledger sheet.

The record sheets shown in Fig. 6 are printed under control of the tabulating machine. The narrow strip 395 carries the record of group numbers of a series of ledger account entries. The other record sheet 396 is used to hold a record of the date, identification, and amount of each item. The sheet is shown as holding ledger account #1524. The date and alphabetical printing may be accomplished under control of devices such as those set forth in my Patent No. 1,926,883.

The sheet is started without any old balance brought forward from a previous sheet. The first two items amounting to $350.00 are recorded the first time the sheet is present in the tabulating machine. Before the second set of entries are printed on the sheet, the balance entry keyboard is operated to add the amount 350 in the accumulator. Then two more items amounting to $700.00 are added and printed, making a total of $1050.00 which is recorded on line 4 of the ledger sheet. The sheet may then be removed and items entered on other sheets before ledger sheet 1524 is again called for by the operator. The operator is apprised of the identification of the items by reading the ledger numbers or group numbers printed on strip 395. The first two ledger numbers are recorded as entries are made in account #1310. The second number is printed as the last item in the 1310 account is entered. It is a sign to the operator that the next series of items relate to account #1470. After entering three series of items in ledger 1470, the entry of the last item is accompanied with the printing of 1524 under control of the first card of the incoming group, which card then passed under the upper brushes as explained hereinbefore.

The operator then inserts the ledger sheet 396 mentioned above. It is noted that the balance or total of the previous entries amount to $1050.00. This amount is set up on the keyboard and the balance key is depressed, thereby entering the amount into the accumulator. The tabulator is then started to read the record cards numbered 1524, also to add and print the data represented thereon. The four items relating to ledger 1524 are added and printed on sheet 396. As the last item is entered, a group change occurs, a new group number 1600 is printed, and a total taking operation is initiated. The amount of the balance $1050.00, plus the four items equal to $1250.00, results in the printing of the total $2300.00 and the clearing of the accumulator ready for another set of entries.

If desired, the strip 395 may be integral with the ledger sheets 396, or rather the group numbers may be printed on a wider ledger sheet. When recording in this way, the printed group numbers may always be compared with the ledger number at the head of the sheet to verify the identification of the item entries. Of course the group number printed at the foot of a series of item entries will always differ from the other group numbers relating to the ledge sheet. This last number informs the operator of the identification of the next ledger sheet to be handled.

When using a separate strip 395 it is apparent that this strip may be removed every time a ledger sheet is taken out of the machine. Since both the strip and the sheet are held around the same platen 248 they will be fed together. Upon inserting a ledger sheet, the strip may be fed along therewith so that a clear space is presented at the printing line.

A better way to handle the ledger sheets is made possible by the use of the well known pressure roller release. If it is desired to remove one ledger sheet and insert another without disturbing the strip, this may be done by operating the pressure roller release to open the feed devices for removal and insertion of ledger sheets.

While an admirable example is shown and described in pointing out the fundamental novel features of the invention, it will be understood that various omissions, substitutions and changes in the form and details of the illustrated device and in its operation, may be made by those skilled in the art without departing from the spirit of the invention. It is the intention, therefore to be limited only as indicated by the scope of the following claims.

What is claimed is:

1. In a machine of the class described, a group of manipulative digit keys comprising a ten key keyboard, a series of slide one for each denominational order, a common adjusting means under control of the keys for adjusting the slides differentially one by one as the keys are operated, means associated with said adjusting means for coordinating the successively operated keys with the different slides, detents for holding said slides in adjusted position, an impulse emitter common to said series of slides, a series of conductors connected to said emitter, and contacts moved by said slides to cooperate with various conductors, whereby said slides select impulses representative of an amount.

2. In a machine of the class described, electrical devices for controlling machine operation by electrical impulses, a series of adjustable denomination slides for varying the operation of said devices, a common lever for adjusting said slides, a carriage carrying said lever from slide to slide, an escapement mechanism for regulating the movement of said carriage, and a group of keys, and operating means for the lever and escapement mechanism under control of the keys any one of which may be manipulated to operate said lever and said mechanism whereby said slides are set to represent selected data.

3. In a machine of the class described, a group of keys, one for each digit, a frame cooperating with said keys, means under control of said keys for operating said frame, differentially according to the key manipulated, a lever operated by said frame, a series of denomination slides adapted to be adjusted by said lever, a carriage carrying said lever from one slide to the next slide on each operation of the keys, a series of conducting bars, a plurality of contacts one on each slide and adjusted thereby to close a circuit with one of said series of bars, and means for directing differentially timed impulses through said bars to control the machine.

4. In a machine of the class described, a group of manipulative keys, a series of slides, means under control of the keys for adjusting the slides, detents for holding said slides in adjusted position, a bail for releasing all of said detents, an actuator for releasing a selected one of said detents, links for connecting said detents with said bail and said actuator, manipulative means for disconnecting any of said links to maintain the setting of certain of said slides, and electrical connections established by the setting of said slides to represent an amount, whereby repeated readings of said settable slides may be taken through said electrical connections.

5. In a machine of the class described, a keyboard for setting up an amount, contact devices, means under control of said keyboard for adjusting said contact devices, conducting bars normally out of contact with said devices, a driving means, a means for moving said conducting bars into contact with said devices, a balance entry key, means under control of said key for connecting said moving means with the driving means, an accumulator, means for operating said accumulator, a common impulse emitter connected to all of said bars, and means under control of the impulses through the bars selected by the adjusted contact devices for controlling said operating means to add the amount set up on the keyboard in said accumulator.

6. In a machine of the class described, a group of numeral keys, a series of slides, means under control of the keys for adjusting the slides, individual detents for holding said slides in adjusted position, a bail for releasing said detents, separate links for connecting said detents with said bail, manipulative means for disconnecting any of said links to maintain the setting of certain of said slides, and electrical connections established by the setting of said slides to represent an amount, whereby repeated readings of said adjusted slides may be taken through said electrical connections.

7. In a machine of the class described, a group of numeral keys, a series of slides, means under control of the keys for adjusting the slides, individual detents for holding said slides in adjusted position, a bail for releasing said detents, separate links for connecting said detents with said bail, a release actuator placed between a selected one of said links and said bail, means for operating said bail a differential amount to release only that detent associated with the actuator and the selected links, and other means for operating said bail a differential amount to release all detents, whereby said slides can be set to represent data and released for correction.

8. In a machine controlled by a single group of ten digital keys for setting one digit at a time, a plurality of rack slides, an operating lever common to said slides, means under control of said keys for adjusting the lever, said lever being adjusted differentially by said keys to adjust said slides, means for connecting said lever with said slides seriatim, contacts on said slides, an impulse emitter, an accumulator, a series of contact bars selectively connected between said accumulator and said emitter by said slide contacts to direct certain impulses from the emitter to the accumulator to control it to add the amount set up by the keys, means for automatically moving said series of bars into contact with said slide contacts, and means for initiating operation of said moving means.

9. In a machine of the class described, a group of keys comprising a ten key keyboard, a series of slides one for each denominational order, a common adjusting means under control of the keys for adjusting the slides differentially one by one as the keys are operated, means associated with said adjusting means for coordinating the successively operated keys with the different slides, means for holding said slides in adjusted position, an impulse emitter common to said series of slides, contacts controlled by said slides, a series of conductors connected to said emitter and normally out of cooperation with said contacts, a driving means, means for moving said conductors into cooperation with the adjusted contacts, a number entry key, means under control of said key for connecting said moving means with the driving means, and an accumulator connected to said contacts and controlled by impulses through said conductors to add the amounts set up by said keys.

10. In a machine of the class described, an accumulator, means for operating said accumulator, a series of adjustable denominational slides, contacts on said slides for conducting impulses to control the operation of said accumulator, electrical control devices cooperating with said contacts for controlling said operating means to enter numbers in said accumulator, conducting bars in said devices stationary relative to said contacts and normally out of contact therewith, a driving means, means for moving said conducting bars into cooperation with said contacts, an entry control key, means under control of said entry key for connecting said moving means with the driving means, a common lever for adjusting said slides, a carriage carrying said lever from slide to slide, an escapement mechanism for regulating the movement of said carriage, a group of keys, and operating means for the lever and escapement mechanism under control of the keys any one of which may be manipulated to operate said lever and said mechanism.

11. In a machine of the class described, a group of keys, one for each digit, a frame cooperating with said keys, means under control of said keys for operating said frame differentially according to the key operated, a lever operated by said frame, a series of denominational slides adjusted by said lever, a carriage carrying said lever from one slide to the next slide on each operation of the keys, a plurality of contacts one on each slide and adjusted thereby to close digit representing circuits, a series of digital conducting bars normally out of contact with said contacts, a driving means, means for moving said conducting bars into cooperation with said contacts, a manipulative means, means under control of said manipulative means for connecting said moving means with the driving means to move said bars into cooperation with said contacts after they have been adjusted, means for directing differentially timed impulses through said bars, an accumulator, and means under control of said impulses for entering the amount represented thereby into said accumulator.

THOMAS A. GAVIN,
*Executor of the Estate of John R. Peirce, Deceased.*